J. BOUSKA.
TREE PROTECTOR.
APPLICATION FILED NOV. 29, 1911.
1,039,018. Patented Sept. 17, 1912.
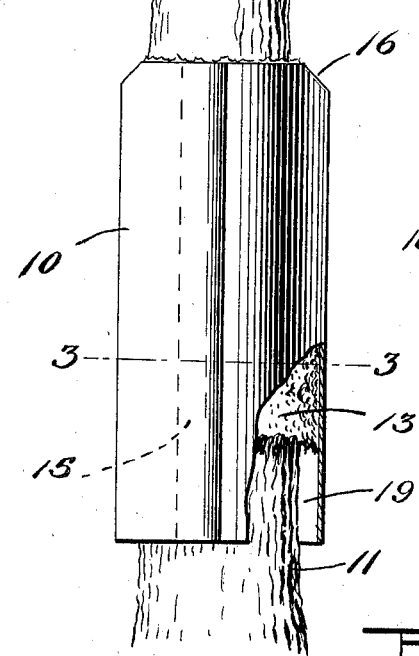
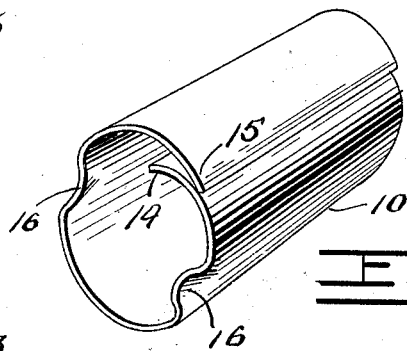
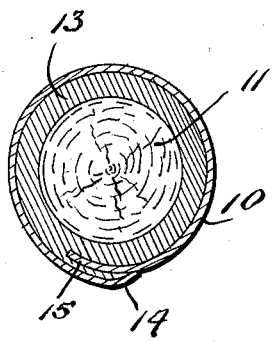
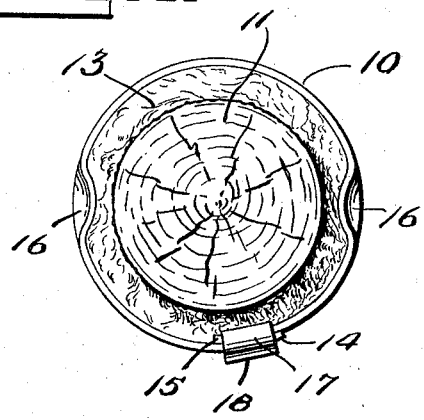
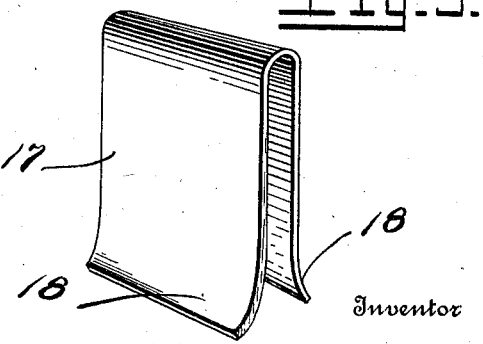
Witnesses
Inventor
J. Bouska.
By
Attorney

UNITED STATES PATENT OFFICE.

JOSEPH BOUSKA, OF BRIDGEPORT, WASHINGTON, ASSIGNOR, BY DIRECT AND MESNE ASSIGNMENTS, TO SUPERIOR TREE PROTECTOR MANUFACTURING CO., OF BRIDGEPORT, WASHINGTON, A CORPORATION OF WASHINGTON.

TREE-PROTECTOR.

1,039,018.   Specification of Letters Patent.   Patented Sept. 17, 1912.

Application filed November 29, 1911. Serial No. 663,056.

*To all whom it may concern:*

Be it known that I, JOSEPH BOUSKA, a citizen of the United States, residing at Bridgeport, in the county of Douglas, State of Washington, have invented certain new and useful Improvements in Tree-Protectors; and I do hereby declare the following to be a full, clear, and exact description of the invention, such as will enable others skilled in the art to which it appertains to make and use the same.

This invention relates to certain new and useful improvements in tree protectors and the primary object of the invention is to provide a simple, cheap and effective means for protecting trees from insects crawling or creeping up the trunks thereof and eating the leaves and buds and thereby killing the tree.

Another object of the invention is to construct a protector of a section of sheet metal of a resilient character which may be rolled into proper shape for engagement around a tree trunk and having one end formed with an abrupt bend adapted to engage the outer face of the other end of the metal thereby forming a joint which will prevent an insect from climbing up the seam as is possible with a roll or hook seam.

Another object of the invention is to construct the protector of a section of metal having a novel form of joint and provided with means for supporting it upon a medicated fabric or medium wound on the drum, the ends of the section of material forming the protector being so connected as to allow the same to spread apart during the growth of the tree.

With the above and other objects in view, the invention consists of certain other combinations and arrangements of parts as will be hereinafter more fully described and claimed, it being a still further object of the invention to provide a device which will not be likely to get out of working order.

In the drawings:—Figure 1 is a side elevation of my improved protector, engaged upon a tree trunk as in use. Fig. 2 is a detailed perspective view of the protector detached from the tree trunk. Fig. 3 is a cross sectional view taken on the line 3—3 of Fig. 1. Fig. 4 is a top plan view thereof showing a means for holding the ends of the section of metal tightly together upon a protector of increased diameter and adapted for use on large trees. Fig. 5 is a detail perspective view of a clasp or means for holding said ends together.

Referring to the drawings in detail, there is shown my improved protector 10, the same comprising a single section of metal of a resilient character bent in cylindrical form for engagement around the tree trunk such as shown at 11. The cylindrical protector thus formed is preferably provided with a coating or covering of varnish or the like so as to render the same smooth and slippery as possible thereby preventing the insects from climbing up the tree upon the outside of the protector when engaged therearound.

When the device is in use, a medicated fabric or medium 13 such as raw cotton, is wound around the trunk of the tree at the proper height and the protector engaged therearound and in order to hold the same firmly upon the said medium, one end 14 is bent inwardly in an angular direction or at an abrupt angle so as to engage the outer face of the end 15 and thereby produce a flat joint or seam for preventing the insects from crawling therebetween as would be permitted by the ordinary roll or hook seam. The protector 10 is further provided with opposed curved depressions 16 in its upper end located at diametrically opposite points to engage the upper portion of the medicated fabric or medium and thereby further assist in supporting the protector in position as well as permitting the protector to expand therewith by movement of the lap joint provided, during the growth of the tree or plant.

When the protectors are manufactured, the end portions 14 of each protector is engaged inwardly of the end portion 15 so as to permit the protector to retain its resiliency and when placed on a tree the end portion 14 is rolled or pressed to tightly engage the same and then carefully pulled back and outwardly of the end portion 15 and thus producing a tight fitting joint assisted by the spring or resiliency of the metal. It will be apparent that the depressions 16 will serve the purpose of hanging or clamping over the medicated medium to prevent rotation of the protector while said medium will prevent the insects from crawling up the trunk of the tree or plant on the inside of the cylinder and also prevent the metal surface from injuring the bark thereof and said fabric or medium is medicated in such a manner as to be absolutely harmless to plant life and have an offensive odor to remain repellent against the harboring of insects within the cylinder. The protectors are to be made in various sizes according to the size of the tree, and may be placed at any point between the ground and the part to be protected against the insects and thereby allow the use of other articles to protect the trunk of the tree as may be desirable. When the device is in use upon large trees a U-shaped spring metal clip 17 having its end portions flared outwardly as shown at 18 is engaged over the overlapped portions of the section of metal forming the protector thereby forming a tighter joint.

Inasmuch as the protector extends below the medicated medium as shown at 19 in Fig. 1 of the drawings, the insects will be prevented from approaching the outer face of the protector directly from the trunk and must first pass by said medium, thereby insuring of their being repelled.

I claim:—

A tree protector comprising a section of resilient metal bent in form to engage a tree or the like, the same having one end bent at an abrupt angle to resiliently engage against the outer face of the metal adjacent the other end and permit expansion thereof, said metal having a coating to render the same smooth and diametrically opposed depressions in the upper end of the protector.

In testimony whereof, I affix my signature, in presence of two witnesses.

JOSEPH BOUSKA.

Witnesses:
C. W. INGHAM,
B. F. SHIX.

Copies of this patent may be obtained for five cents each, by addressing the "Commissioner of Patents, Washington, D. C."